April 23, 1968     C. M. CLARK     3,380,020
METHOD AND APPARATUS FOR DIVIDING MEASURABLE
VARIABLE INTERVALS INTO AN EXACT
NUMBER OF SUBINTERVALS
Filed May 20, 1966     5 Sheets-Sheet 1

FIG. 1

INVENTOR
CALVIN M. CLARK

BY
ATTORNEYS

3,380,020
METHOD AND APPARATUS FOR DIVIDING MEASURABLE VARIABLE INTERVALS INTO AN EXACT NUMBER OF SUBINTERVALS

Calvin M. Clark, Fullerton, Calif., assignor to Chevron Research Company, San Francisco, Calif., a corporation of Delaware
Filed May 20, 1966, Ser. No. 551,669
10 Claims. (Cl. 340—15.5)

ABSTRACT OF THE DISCLOSURE

A method and apparatus is disclosed for dividing measurable but variable intervals into a predetermined exact number of subintervals. The method is accomplished by measuring at one time scale the period between the measurable intervals so as to accumulate a count at that time scale. The total count is then used to identify the subintervals by recounting the accumulated count of the first time scale at a higher time rate. The established ratio between the higher time rate and the original counting rate determines the number of subintervals produced during the measured interval. Each time a total is accumulated at the higher time rate equalling the accumulated count of the first time scale, a subinterval is identified.

---

This invention relates to the accurate division of a measurable distance or interval of time into a number of equal increments; more particularly, the invention relates to a method and apparatus for sampling a signal appearing during a fixed interval of space or time in an accurate number of equally spaced samples.

In accordance with the present invention an interval of time, which may directly relate to an interval of distance, is measured by accumulating a count of a reasonably well controlled, substantially constant frequency first signal occurring during that measured interval, the measured interval is then divided into equal increments by repeatedly reducing that accumulated count to zero at the rate of a second signal having a frequency as many times larger than the first signal as the number of increments into which the measured time or distance is to be divided. In this manner a larger measured interval is divided into the desired number of equal subintervals and, when more than one of the larger intervals is under consideration, the number of subintervals will be the same regardless of the overall length of each of the larger intervals or variations in the length of the larger intervals.

In the art of processing geophysical data derived from seismic surveys it has become increasingly more important to convert the data from analog form to digital form for use in high-speed digital computers. Through many years of seismic surveying much of the accumulated geophysical data is in the form of analog signals recorded on reproducible records. A considerable portion of the existing data acquired many years ago is in the form of recorded oscillograph traces on photographic film or photographic paper. In many cases this film or paper has been subjected to conditions causing it to shrink or stretch nonuniformly along its length. While the data appearing on the record can be identified accurately with respect to a timing signal existing on the record, the interval between adjacent timing signals may not always be reproduced as an exact interval of time even though the record is transported at what is thought to be a constant speed with respect to some reproducing device. The discrepancies in time between these recorded time intervals may vary to some even greater extent when intervals spaced at large distances along the record are compared to one another.

The foregoing condition in photographic records is somewhat improved with the more modern magnetic recording systems employing more stable recording media; however, discrepancies in time intervals still exist in reproducing these records due to the conditions known as "wow" and "flutter."

It has been proposed to apply speed control to the transportation of the record with respect to the reproducing device so as to maintain a substantially constant interval of time between the beginning and ending of each time interval recorded on the record regardless of the position being reproduced along the record. When the record is transported at a reasonably slow speed such techniques are effective; however, when high-speed conversion techniques are applied it becomes extremely difficult to control the relative movement rate in the small interval of time that is permitted for each adjustment. At its best, only an average of a number of time intervals can be used to attempt to control reproducer speeds in the modern high-speed reproducing systems. These approximations of position along a record are not adequate in the modern precise digital data processing techniques.

In accordance with the present invention each major interval of time recorded on the record is measured in a reasonably accurate manner. The measurement is accomplished by accumulating a count of a first signal, the count is the number of cycles or clock pulses of a reasonably well controlled frequency source occurring during the measured interval. The measured interval is then divided into the desired number of subintervals by repeatedly comparing the accumulated count to a cumulative count of a second signal, the second signal is extremely accurately controlled with respect to the first signal so as to be exactly the number of times higher in frequency than the first signal as the number of intervals into which the larger interval is to be divided. A subinterval is identified each time the cumulative count of the second signal equals the accumulated count of the first signal. In the conversion of analog data into digital data, the analog signal is sensed during the process of subinterval determination and, each time a subinterval is identified, the analog signal is measured as a digital quantity. These digital measurements are then recorded along with an address signal representing the subinterval within the larger interval so that the address accurately identifies its time position along the seismic trace.

Further objects and features of the invention will be readily apparent to those skilled in the art from the specification and appended drawings illustrating a preferred embodiment wherein.

Figure 1:
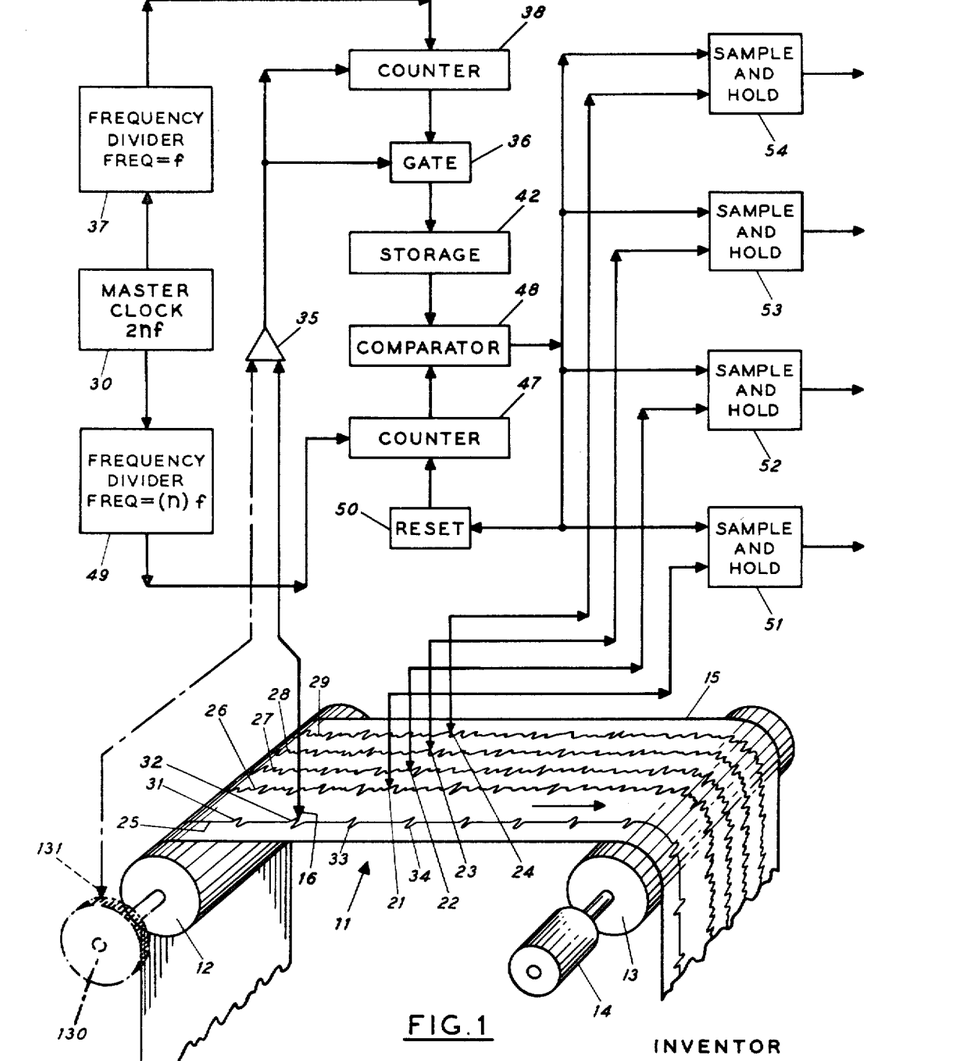
FIGURE 1 is a schematic block diagram of the logic system employed in separating an analog time signal representing a first time interval into a series of accurately spaced equal subintervals.

In FIGURE 1 of the drawings an analog record reproducing system 11 is illustrated as having a source reel 12 and a take-up reel 13 driven at a reasonably well controlled speed by motor 14 so as to transport a record 15 at a substantially constant speed with respect to a plurality of reproducing heads 16, 21, 22, 23 and 24. The record 15 shown herein is intended to represent either a photographically reproducible record or a reproducible magnetic tape record. The individual traces illustrated on the record are shown as analog wiggly lines; however, it should be understood that the actual recording may be in the form of invisible magnetic recordings as well as variable density, variable amplitude or variable area visible recording. Furthermore, the reproducing heads as illustrated herein are merely shown as schematic pickup devices; it should be understood that in the case of an optically recorded record these may be photosensitive devices that either scan the record or respond to a source of light transmitted through the record. In any case the actual pickup system or technique forms no critical part of this invention and the illustration herein is merely schematic.

The record 15 is illustrated as containing a timing trace 25 and a plurality of individual geophysical record traces 26, 27, 28 and 29 each produced originally by a separate surface geophone or by the combined signals from several surface geophones. In an analog to digital conversion system as illustrated in FIGURE 1 it is desired to convert the analog signals as recorded on the traces of the tape into an accurate number of digital quantities during the interval between adjacent timing marks on the timing trace 25. The individual timing marks are here illustrated as separate wiggles 31, 32, 33, 34, etc., along the timing trace 25.

The information to be counted is derived from a master clock 30 which supplies pulses or oscillatory signals to a frequency divider source 37. The source 30 supplies very high frequency signals, preferably crystal controlled, and the divider 37 processes these signals to generate a first frequency signal for energization of the counter 38. The counter accumulates a count of the cycles of its input signal occurring during a controlled interval of time; that time in the present case being the period between timing marks along the timing trace of the seismic record.

In operation the record 15 is transported with respect to the reproducing heads in the direction of the arrow as illustrated on the tape. As the first information on the timing trace 25 arrives at reproducing head 16, the time signal is reproduced and its waveform is sharpened in amplifier 35 to provide an activating pulse to the gate 36 and counter 38. Gate 36 is momentarily opened by the activating pulse to transfer any quantity in counter 38 to the storage 42. The activating pulse then clears counter 38 and prepares it for another accumulation of the signals from divider 37. When the next timing mark passes under the reproducing head 16, gate 36 is again activated and counter 38 is cleared. This operation of gate 36 transfers the accumulated count in counter 38 into storage 42. The storage 42 retains the accumulated count of the signals originating from source 37 that occurred during the time interval taken to transport the first and second timing marks under the reproducing head 16.

Also energized from master clock 30 is a second frequency divider 49 appropriately designated to supply as its output pulses or a signal having a frequency the number of times faster than the signals from divider 37 that it is desired to divide each interval into. In the same manner as signals are accumulated in counter 38, the counter 47 accumulates a count of the signals from divider 49. The accumulations of these two signals are supplied to the comparator 48.

In the comparator 48 the accumulated count in storage 42 of signals from source 37 in counter 38 is compared to the count proceeding in counter 47. The comparison may be accomplished by maintaining the quantity transferred from storage 42 and comparing it, order for order, to a count accumulating in counter 47. When these two quantities are equal, an output signal is supplied from comparator 48. Each output signal from the comparator 48 energizes a reset 50 so as to clear counter 47 to its zero state and to reinitiate the counting of source signals for comparison to the quantity continuously supplied from storage 42.

Simultaneously with the continued generation of output signals from the comparator 48 each time the count accumulation in counter 47 equals the count stored in storage 42, the geophysical signals on the traces 26, 27, 28 and 29 are being reproduced by the reproducing heads 21, 22, 23 and 24, respectively. It should be noted that reproducing head 16 is illustrated as having been physically advanced by one timing interval with respect to the seismic signals within the traces 26, 27, 28 and 29. By this procedure the interval between the timing marks related to certain seismic data traces is measured as an accumulation of a count in counter 38 and then that count is used in the subdividing of the interval as the seismic data is reproduced. These signals are transmitted to a like plurality of separate sample and hold circuits 51, 52, 53 and 54. Each of these circuits has a signal from one trace of the seismic record and is supplied with a keying signal from the comparator 48. Each time the comparator 48 senses that the stored quantity in storage 42 and the count register in counter 47 are equal a signal is transmitted to all sample and hold circuits to institute the digitizing of the then instantaneous amplitude of the signal on each trace as reproduced by the separate reproducing heads. It is also possible to process one trace at a time, in which case only one timing record subdivision may be necessary. When the one trace at a time technique is employed, an auxiliary record of the subinterval times can be made and that record repeatedly reproduced to establish the times for digitizing the quantities along each geophysical trace as it is reproduced.

Figure 2:
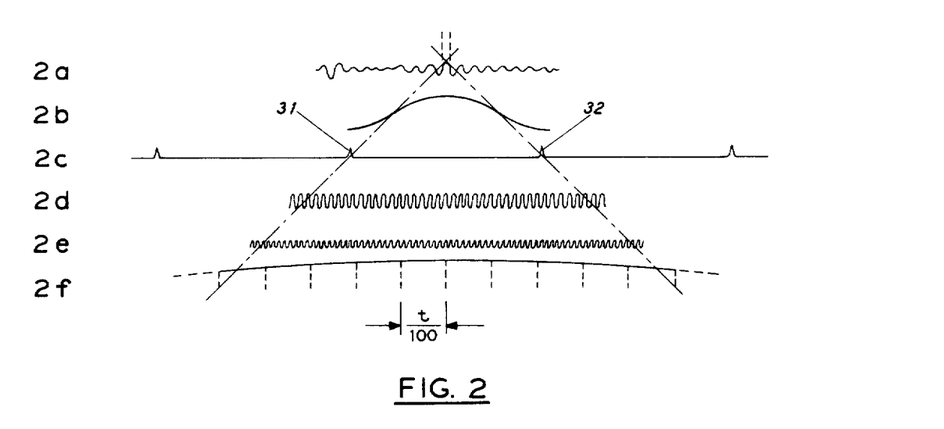
FIGURES 2 and 3 are waveform diagrams illustrating the process of the present invention.

FIGURE 2 illustrates a related group of waveform patterns occurring during a portion of a record of the type illustrated in FIGURE 1. Waveform 2a is a portion of a trace of a geophysical signal that is to be separated into the preferred number of subintervals for digitization at each of the subintervals. Waveform 2b illustrates that portion of the trace 2a between the two dotted lines and is one of the portions of the trace to be divided into the equal subintervals. Waveform 2c illustrates two successive timing marks here identified as 31 and 32 occurring along the record 15 during the period of time that the portion of the record shown in waveform 2b has occurred. Waveform 2d is the signal from frequency source 37 occurring during the interval between timing marks 31 and 32. For the purpose of the present explanation consider that normally 100 cycles of the signal from source 37 will occur during the interval of time between timing marks 31 and 32 and that, during that interval of time, the geophysical signal has taken the excursion of waveform 2b. Waveform 2e is on a further expanded scale and is intended to illustrate the signal to counter 47. As illustrated herein, the frequency of the signals to counter 47 is intended to be precisely 10 times faster than the frequency of the signals from source 37. Waveform 2f illustrates, on a further expanded scale, the excursion of the geophysical signal during the interval of time between timing marks 31 and 32.

Referring now to the block diagram of FIGURE 1 and the waveform pattern of FIGURE 2, it should be seen that the comparator 48 is able to perform a comparison between the accumulated count of signals from the source 37 (represented in waveform 2d) to the count of the signals from source 49 (represented in the waveform 2e). Each time the accumulated count of 100, as here illustrated, of counter 38 signals as stored in storage 42 is equaled by the cumulative counts as registered by the counter 47, a pulse is produced and the count in counter 47 is reduced to zero or cleared. As shown in waveform 2f, these 100-count accumulations occur 10 times along the waveform excursion of the seismic signal, and further as described above, each time the pulse occurs the geophysical signals are digitized. During the period between timing marks 31 and 32 a precise number of digitizations has occurred, each one being spaced an identical number of cycles of the signals of source 49 from each other.

The illustration of FIGURE 2 is the ideal situation where perhaps the preferred number of source 37 signals has occurred in the interval between timing marks. That is, assuming that when the original record was recorded it was intended that exactly 100 cycles of a timing signal should occur between each of the timing marks on the trace and that count of 100 was produced in counter 38 and supplied to storage 42.

Figure 3:
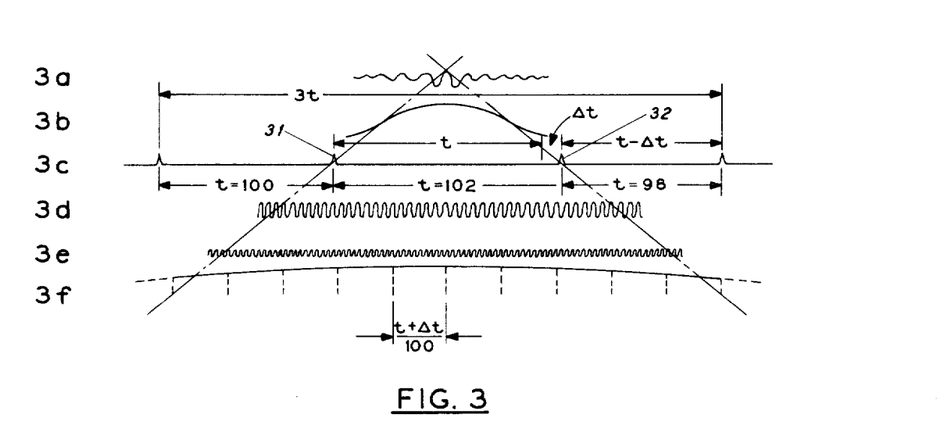

FIGURE 3 illustrates another condition that might occur if the geophysical record were to become stretched or if "wow" or other distortions were to occur. In this figure, waveform 3a illustrates a geophysical signal to be divided into equally spaced subintervals. The actual portion of the record occurring between adjacent timing marks is illustrated in waveform 3b, and the timing marks are illustrated in waveform 3c. In the 3c waveform the timing marks 31 and 32 are spaced a larger distance apart than were the same illustrated marks in waveform 2c of FIGURE 2, thus illustrating a stretch of the geophysical record. It is still desired, however, that the interval between these two marks be divided into exactly the same number of incremental parts or subintervals as did occur during the conditions illustrated in FIGURE 2.

Waveform 3d again illustrates the signals from source 37 again substantially the same frequency as illustrated in waveform 2d of FIGURE 2; however, during the interval between timing marks 31 and 32 of FIGURE 3, the signal from source 37 has passed through 102 cycles. This count of 102 cycles is stored in storage 42 for comparison to counter 48 in the comparator 48. Waveform 3e illustrates the counter 47 signals again occurring at a precise multiple, here 10, times faster than the signals from the source 37. During the interval as illustrated in FIGURE 3, the comparator 48 has supplied to it the count of 102 from storage 42 and this quantity is counted repeatedly by counter 47 at the frequency of the signals from source 49. Each time the comparator senses an equality of counts in storage 42 and counter 47, requiring 102 cycles of the source 49 signal, a pulse is supplied at its output.

Referring now to the waveform 3f, it can be seen that the interval between the beginning and the ending of the portion illustrated has been divided into 10 portions. Each of these portions is a slight bit larger than the portion illustrated in waveform 2f of FIGURE 2; however, exactly 10 of these have occurred in the interval illustrated and each of these subintervals is exactly the same size as the others. In the case of the FIGURE 3 stretched portion of the geophysical record, the comparator will continue to have a count of 102 supplied to it from the storage 42 until the next time interval of the record has reestablished a count in the counter 38. The next interval may be smaller than 100, for instance 98, in which case the comparator 48 will have as its repeated input a count of 98 and that number will be counted up again in counter 47 at the frequency of the signals from source 49. Each time the count of the faster frequency equals the stored count of the slower frequency, an output pulse will be supplied. These pulses will be spaced by an incrementally smaller subinterval; however, the desired number of pulses will still occur within the interval between timing marks.

Figure 4:
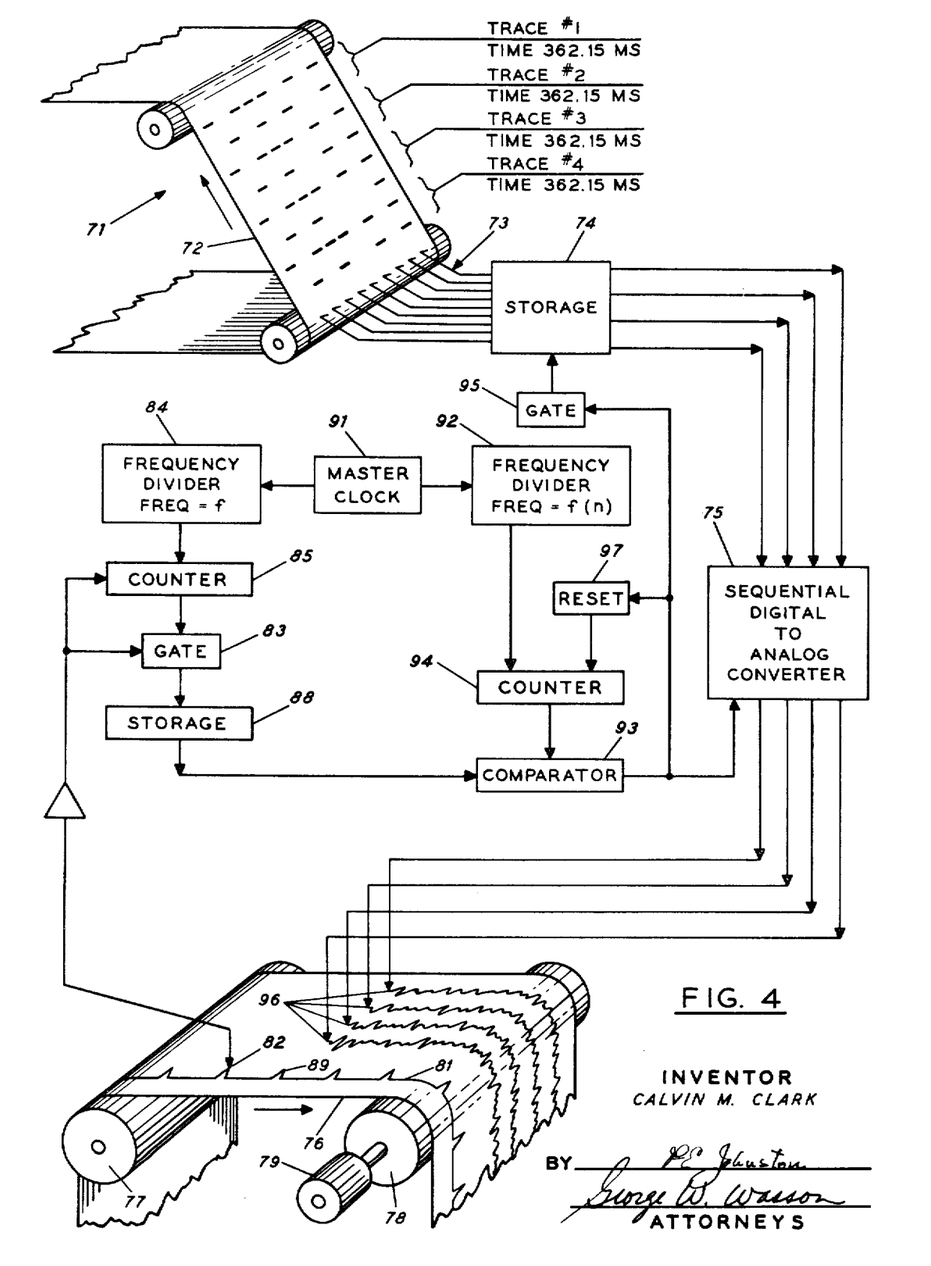
FIGURE 4 is a block diagram illustrating the conversion of digital data to analog data.

FIGURE 4 illustrates, in block diagram form, an apparatus that may be employed in converting digital data to analog data. In this conversion process it is desired that the information deposited between each of the major timing marks on a reproducible record be deposited uniformly between each of the marks. However, sometimes the source of the digital information is not absolutely synchronized with the timing trace on the record on which the analog form of the information is to be applied. To ensure that the data will be properly positioned on the analog recording system it is necessary that the area of the analog record system be identified and divided into appropriate numbers of subintervals so that the digital data may then be identified and supplied to analog signal record heads.

To accomplish the conversion and recording of digital data to analog form, it is necessary that the digital data be first converted to analog signals. As illustrated in FIGURE 4, a high-speed digital tape transport is shown at 71. The tape 72, as illustrated, is only one of several forms that are well known in the digital tape recording systems; in this system two rows of bits identify a byte. Each byte identifies an original signal derived from usually one geophone as that signal is digitized at one of its subintervals. Each byte also includes an identification signal that is unique to the subinterval of that signal. In the system shown in FIGURE 4 these characters are reproduced by an appropriate number of reproducing heads 73 and supplied, preferably in binary form, to a storage 74. Upon appropriate command, the storage supplies two output signals, one a binary code of the digital value from tape 72 and the other a binary code address signal corresponding to the unique subinterval identification in the digital recorded character from tape 72. These two signals are supplied to digital-to-analog converter 75 where they are available substantially instantaneously when a readout command signal is given.

The recording apparatus of FIGURE 4 is substantially the same as that described in FIGURE 1; however, in this case the analog recording system is operated to record the signals rather than to reproduce previously recorded signals. The recording system, as illustrated, constitutes a recording medium 76 supplied from supply reel 77 and wound around a take-up reel 78 as driven by motor 79. Prior to the operation of the tape in this recording mode a timing signal 81 is recorded onto the tape 76. The timing signal 81 will be maintained as uniform as is possible so that the intervals between major timing marks along the tape will be uniformly spaced. A reproducing head 82 senses the first of a major timing interval and that signal is sharpened through an appropriate amplifier and supplied to a gate 83 and counter 85. Counter 85 is supplied with pulses or oscillatory signals from frequency divider source 84. Frequency divider 84 is energized by signals from master clock 80 and operates to generate signals at a prescribed lower repetition rate.

As in the case of the FIGURE 1 apparatus, the counter will have counted the number of pulses of the signal from source 84 that occurred during the period between two timing marks as the record was transported under head 82 and that count of signals will be supplied to storage 88. The counter 85 then returns to counting the signals from the source between the next major timing interval.

The quantity in storage 88 is continuously supplied to comparator 93 and is changed only when a new accumulated count is supplied from the counter 85. Also supplied to the comparator 93 is an accumulating signal from counter 94 being a count of the pulses or cycles of a signal from frequency divider source 92. Source 92 is supplied with signals from the master clock 91 and is appropriately designed to produce an output signal the desired multiple of the signal from source 84. The counter 94 thus accumulates a count of the number of pulses of the signal from source 92 that occur after the timing mark has been sensed by reproducing head 82.

The comparator 93 performs the same operation as the comparator described in FIGURE 1, that is equating the signal count supplied from the storage 88 to the signal count from counter 94. Each time the comparator detects equality a gate pulse is supplied to a gate 95 to cause certain signals from storage 74 to be supplied to the sequential digital-to-analog converter 75 and thus to an appropriate number of recording heads 96 positioned on the tape 76. The gate pulse from comparator 93 is also supplied to a reset gate 97 to cause counter 94 to be reset to zero so as to accomplish the next count up of the signal supplied by source 92.

With the apparatus of FIGURE 4 the interval between major timing marks on an analog record tape is divided into a desired number of subintervals and at each of these subintervals a converted digital signal is retrieved and supplied to a recording head for deposition onto the analog record. The interval between each major timing mark is divided into exactly the same number of subintervals and the spacing between the deposited retrieved signals is uniform within each major timing interval.

Figure 5:
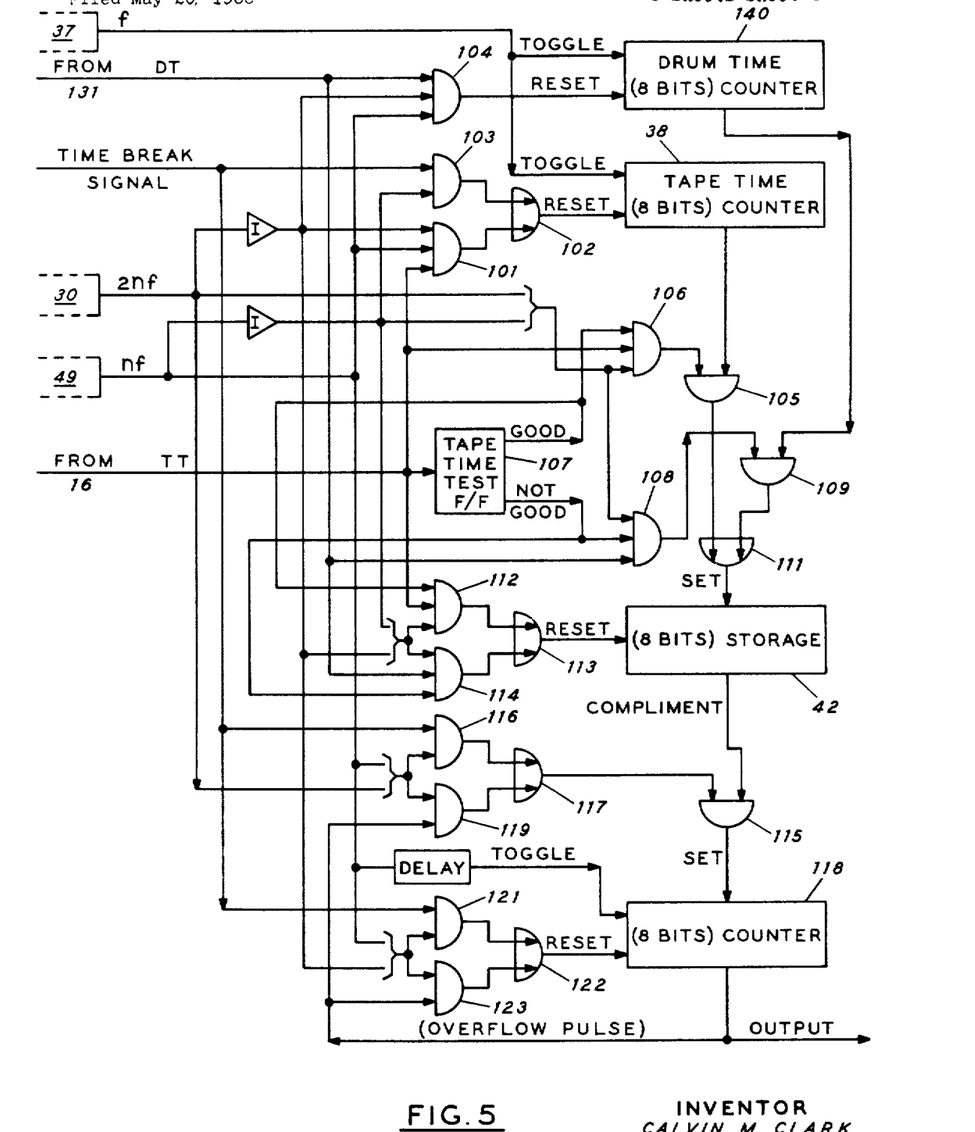
FIGURE 5 is a schematic diagram of the electronic logic systems employed with FIGURES 1 and 4.

The circuit of FIGURE 5 illustrates one form of apparatus that may be employed to accomplish the functions outlined in block diagram form in FIGURES 1 and 4. The circuits illustrated schematically in FIGURE 5 provide for the synchronization of the transfer of accumulated counts from the counters to the register and to the comparator as well as the resetting of the counters and the register. In this figure a group of conductors are illustrated with letter designations; these designations are as follows: $f$ is the signal from frequency divider 37, DT is the signal from a timing gear 130 and pick-up head 131 (described hereinafter) driven by the take-up reel 12 and illustrated in FIGURE 1, $2nf$ is the signal from the master clock 30, $nf$ is the signal from the frequency divider 49, TT is the signal produced by the pick-up head 16 and represents the tape timing signal, and the other conductor is identified as "time break signal" and represents a reference signal to which all other information on a seismic record is related.

In the diagram of FIGURE 5 a pair of counters are illustrated, one constituting the counter 38 having the function of the counter illustrated in FIGURE 1 and the other a counter 140 actuated by DT signals and providing an auxiliary counting circuit to keep the apparatus of FIGURE 1 operative even though some breakdown should occur in the timing trace 25. The counter 38 is first reset to an initial condition, such as zero count, by the time break signal or by the detection of the first tape time signal. This operation is accomplished by supplying the TT signal to an AND gate 101 along with signals $nf$ from the frequency divider 49 and signals $2nf$ inverted from the master clock 30. When all of these input signals are in the proper state, AND gate 101 supplies a signal to an OR gate 102 where an output signal is produced to reset counter 38. The other input to the OR gate 102 is supplied from an AND gate 103 having as its input the time break signal and an inverted $nf$ signal from frequency divider 49. With a signal from either gate 101 or 103 the OR gate 102 resets counter 38. Also supplied to the counter 38 is a toggling signal $f$ from the frequency divider 37, this being the signal whose pulses or cycles the counter accumulates.

While counter 38 is accumulating its count the counter 140 is also accumulating counts of the pulses or cycles of the $f$ signal. This counter is reset by signals from an AND gate 104 having as its input the DT signal of the drum time wheel 130, the inverted $2nf$ signal from the master clock 30 and the $nf$ signal from the frequency divider 49. When all three of those signals are in the proper state the counter 140 will be reset.

The output signal from counter 38 is supplied to an AND gate 105 along with a signal from AND gate 106. AND gate 106 has as its input signals a signal derived from a flip flop circuit 107 that tests the tape time signal to determine its acceptability. If the signal is good, an appropriate signal is supplied to gate 106. If the signal is not good, another signal is supplied to gate 108. A second signal to gate 106 is the tape time signal from pick-up head 16, and the third signal to gate 106 is from an AND gate, not shown, where the signals of $2nf$ from master clock 30 and $nf$ inverted from frequency divider 49 are combined. When all of these signals are in the proper state another input signal is supplied to AND gate 105 to produce an output signal from that gate. The function of gates 105 and 106 and flip flop 107 is to accept the signals from counter 38 when the tape timing signal is good.

When the tape timing signal is not acceptable a signal is supplied from gate 108 to AND gate 109. Gate 109 has supplied to it the accumulated count signals from counter 140. Gate 108 has as its input the combined $2nf$ and inverted $nf$ signals along with the drum time signal from wheel 130 and the NOT GOOD signal from flip flop 107. The output signals from gates 105 and 109 is supplied to an OR gate 111 so that either the counter 38 or the counter 140 signals are supplied as the set signal to register or storage 42.

The register therefore has as its stored quantity the counts accumulated between timing marks or between teeth on the drum wheel, whichever is to be used as the master count for the subinterval determinations. The register is reset with the accumulated count each time a new major time interval has been measured. To accomplish that purpose a reset signal is supplied from an appropriate logic circuit. The logic circuit includes an AND gate 112 having as its input the GOOD output signal from flip flop 107, the tape time signal and the combined signal of $2nf$ inverted and $nf$. When these two signals are appropriately phased, a signal is supplied to an OR gate 113 to function as the reset for storage 42.

When a NOT GOOD signal is supplied from flip flop 107, that signal is supplied to AND gate 114 along with the drum time signal, the $2nf$ inverted signal and the $nf$ signal to also supply an input signal to OR gate 113. Regardless of the state of the flip flop 107, the storage 42 will be reset each time a drum time signal or a tape time signal is generated and the count set into the register will be supplied from the appropriate counter 38 or 140.

One improved form of generating the subinterval output pulses involves supplying the complement of the quantity stored in storage 42 to a counter and then energizing the counter to count to an overflow pulse. The overflow pulse will then identify the accumulation of the appropriate number of signal counts. The generation of a complementary signal with a binary storage device is a simple matter and involves merely transferring the opposite condition of each order of the binary storage. This is accomplished in the circuit of FIGURE 5 by supplying the complement of the quantity stored in storage 42 to an AND gate 115 along with a signal from a logic circuit that is energized by time break or reset signals.

The logic of the other signal to AND gate 115 is supplied from a first AND gate 116 having as its input the time break signal and the combined $2nf$ and $nf$. When these signals are appropriately phased, an output signal is supplied to an OR gate 117 to set the counter 118 with the signal from storage 42. Alternatively, and after the initial time break, the gate 115 will be energized by signals supplied to AND gate 119 constituting the $2nf$ and $nf$ signals along with an overflow signal from counter 118. Thus whenever an overflow has occurred in the counter 118 the counter will be again set with the complement of the quantity stored in the storage 42.

Counter 118 is toggled by slightly delayed signals from the $nf$ signals of frequency divider 49 so as to count to an overflow from the preset complement quantity at the speed of the higher signals. The delay is provided to ensure that all the reset and set operations have been accomplished before counting proceeds. The counter 118 is reset by signals from the logic circuit employing an AND gate 121 having as its input signals the time break signal and the combination of the $2nf$ inverted and the $nf$ signal. An output signal from that AND gate is suppled to OR gate 122 to reset the counter 118. After an overflow occurs in the counter 118 an overflow signal is supplied to AND gate 123 along with the $2nf$ inverted and the $nf$ signals to supply an output to OR gate 122 and a reset pulse to counter 118 on the occurrence of the overflow.

Figure 6:
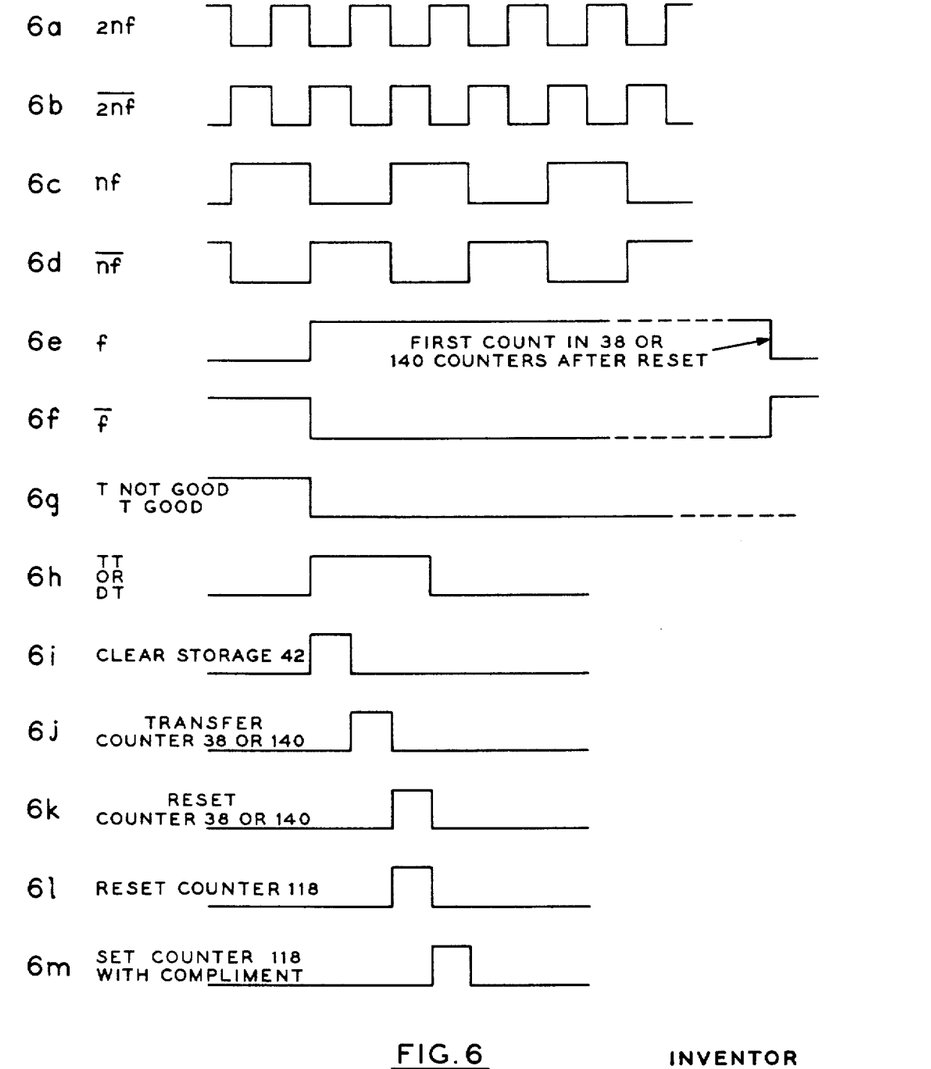
FIGURE 6 is a waveform diagram illustrating the timing of the logic circuits.

FIGURE 6 is a waveform diagram of the several signals involved in the logic operations of FIGURE 5 as well as the operating signals supplied from the logic circuits. 6a is the 2nf signal, 6b is the 2nf signal inverted, 6c is the nf signal, 6d is the nf signal inverted, 6e is the f signal, 6f is the f signal inverted, 6g is the condition of the flip-flop 107 (GOOD and NOT GOOD), 6h is the (TT) tape time or (DT) drum time signal, 6i indicates the time of the clear pulse to storage 42, 6j indicates the time of the pulse initiating transfer of the count from counter 38 or 140 to storage 42, 6k indicates the timing of the reset pulse to counters 38 and 140. 6l indicates the timing of the reset pulse to the counter 118, and 6m indicates the timing of the transfer of the complement signal into counter 118.

The logic of the circuit of FIGURE 5 and the combined AND and OR gates is to ensure that the counters 38 and 140 are unloaded into the storage 42 before they are supplied with a reset signal to return the counters to a zero condition. It should be obvious that the inverted signals of certain of the reference signals provide for opposite polarity timing arrangements. Furthermore, in the operation of the counter 118 it is required that the counter be reset to zero on each overflow before the quantity from the storage 142 in its complementary form is supplied to the counter. All of these functions are accomplished by the circuit interconnections as illustrated in FIGURE 5.

With the circuit of FIGURE 5 any failure in the timing signals from pick-up head 16 will instantly cause the circuits to be operated by the count accumulated in the counter 140. While circuits could be provided to return the circuit to operation from the tape time signal, if that signal again appears, it is usually appropriate to continue with an artificial timing signal rather than to return to a signal whose authenticity may be questionable. For that purpose the tape time test 107 is shown as a flip-flop circuit without having a return condition.

While certain preferred embodiments of the invention have been specifically disclosed, it should be understood that the invention is not limited thereto as many variations will be readily apparent to those skilled in the art and the invention is to be given its broadest possible interpretation within the terms of the following claims.

I claim:

1. A method of dividing a measurable interval of time into a predetermined number of equal subintervals, comprising the steps of:
    (a) accumulating a count of the cycles of a uniformly repeating reference signal beginning with the beginning of said interval and terminating at the end of said interval,
    (b) then generating an oscillatory keying signal repeating at a rate exactly said predetermined number times faster than said repeating reference signal,
    (c) then accumulating a count of cycles of said keying signal, and comparing the count of said keying signal cycles to the accumulated count of said reference cycles,
    (d) and generating a subinterval pulse each time said accumulated count of keying signal pulses equals said accumulated reference pulse count,
    whereby said predetermined number of subintervals pulses will be generated during said measurable interval and each of said pulses will be equally spaced in time relative to the other pulses within said measurable interval.

2. A method for sampling at least a portion of a time varying reproducibly recorded signal in a predetermined number of equally spaced samples, wherein said portion is identifiable with beginning and ending marks, comprising the steps of:
    (a) reproducing said signal and said beginning and ending marks in sequence,
    (b) measuring the time interval between said beginning and ending marks by accumulating a count of cycles of an oscillatory signal occurring during said interval,
    (c) repeatedly reproducing the total count accumulated during said interval at a rate said predetermined number times faster than said oscillatory signal,
    (d) and sampling said portion of said reproducibly recorded signal along its time axis each time said total count is accumulated at said faster oscillatory signal rate.

3. A method of dividing a reproducible measurable interval of time into a predetermined number of equal subintervals comprising the steps of:
    (a) sensing the beginning of said interval,
    (b) sensing pulses of a uniformly repeating reference signal beginning with said sensed beginning of said interval and accumulating a count of the number of pulses of said reference after beginning said signal sensing,
    (c) sensing the termination of said interval,
    (d) terminating the count of said reference pulses and storing the accumulation of said pulses between said beginning and said termination of said interval,
    (e) then generating an oscillatory keying signal repeating at a rate exactly said predetermined number times faster than said repeating reference pulse,
    (f) and then accumulating a count of pulses of said keying signal, comparing the count of said keying signal pulses to the accumulated count of said reference pulses and generating a subinterval pulse each time said count of keying signal pulses equals said accumulated reference pulse count,
    whereby said predetermined number of subintervals pulses will be generated during said measurable interval and all pulses will be equally spaced in time relative to the other pulses within said measurable interval.

4. The method of claim 3 wherein said accumulating count of said reference signal and said keying signal is a binary count, and said comparing is accomplished by adding counts of said keying signal to the complement of said count of said reference signal so that said subinterval pulses are generated each time said added counts reaches a fixed quantity.

5. In a system for digitizing a seismic trace wherein a digital quantity is generated representing the amplitude of the seismic signal at a predetermined number of uniformly spaced time subintervals between spaced timing marks along the time axis of said trace, a method for accurately dividing said time between timing marks into said uniformly spaced subintervals comprising the steps of: moving said trace under a reproducing means at a substantially uniform rate and,
    (a) sensing a first timing mark along said trace,
    (b) gating an oscillator upon sensing said first timing mark, said oscillator being operative to generate a first signal oscillating at a repetition rate much faster than the repetition rate of said spaced timing marks,
    (c) sensing the next subsequent timing mark along said trace,
    (d) accumulating a record count of the number of oscillations of said first oscillator signal between the sensing of said first and said second timing marks,
    (e) generating a second signal oscillating at a repetition rate said predetermined number of times faster than the repetition rate of said first signal,
    (f) accumulating a count of a number of oscillations of said second signal and generating a gating signal each time the count of said second oscillator signal equals the recorded count of said first signal as accumulated between said first and second timing marks,
    (g) and establishing one of said uniformly spaced subintervals with each of said gating signals whereby said time between said timing marks is accurately subdivided.

6. The method of claim 5 wherein said seismic signal is digitized each time a subinterval is established with said gating signals.

7. The method of claim 5 wherein an auxiliary reproducible record is made of said uniformly spaced subintervals constituting a time base record of said gating signals, and said auxiliary record is reproduced while reproducing said seismic trace and said seismic signals are digitized with each reproduction of said recorded gating signals.

8. A method of dividing measurable time intervals along a time base record into a predetermined number of equally spaced subintervals, comprising the steps of:
  (a) reproducing each of said measurable time intervals in sequence along said record,
  (b) accumulating a count of the cycles of a uniformly repeating reference signal beginning with the beginning of each of said intervals and terminating at the end of each of said intervals,
  (c) generating an oscillatory keying signal repeating at a rate exactly said predetermined number of times faster than said reference signal,
  (d) repeatedly accumulating a count of the cycles of said keying signal and generating a subinterval gating pulse each time said accumulated count of said keying signal equals the count of said reference signal measured during each of said intervals, and recording a reproducible auxiliary record of said gating pulses in an alignable relationship with said time base record,
  whereby repeated reproductions of said time base record and said auxiliary record may be employed to subdivide said measurable interval into an equal number of subintervals.

9. An interval interpolator comprising:
  (a) means for accumulating a count of a first signal having a fixed repetition rate so as to establish a quantity representing said interval to be interpolated,
  (b) a comparator having two input circuits and including means for producing an output signal upon the attainment of equality between signals supplied through said input circuits,
  (c) a second signal having a repetition rate related to the rate of said first signal and having a period as many times shorter than the period of said first signal as it is desired to interpolate said interval,
  (d) means for supplying said accumulated quantity of said first signal and said second signal individually to said two input circuits,
  (e) a gate means actuated each time said comparator produces an output signal representing said equality between said accumulated first signal and said second signal,
  (f) and means for repeatedly reinstating said accumulated first signal quantity and repeating said comparison.

10. The apparatus of claim 9 including means for revising said accumulated quantity for subsequent intervals of different duration, whereby each of a plurality of intervals is interpolated into the same number of subintervals.

References Cited
UNITED STATES PATENTS

| | | | |
|---|---|---|---|
| 3,265,867 | 8/1966 | Venn et al. | 235—92 |
| 3,277,473 | 10/1966 | Calhoon et al. | 235—29 |

BENJAMIN A. BORCHELT, *Primary Examiner.*

R. M. SKOLNIK, *Assistant Examiner.*